(12) United States Patent
Nibe

(10) Patent No.: US 8,073,077 B2
(45) Date of Patent: Dec. 6, 2011

(54) RECEPTION QUALITY CALCULATION METHOD, RECEPTION QUALITY CALCULATION APPARATUS, AND COMMUNICATION APPARATUS

(75) Inventor: Keiji Nibe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 659 days.

(21) Appl. No.: 12/000,857

(22) Filed: Dec. 18, 2007

(65) Prior Publication Data

US 2008/0107215 A1 May 8, 2008

Related U.S. Application Data

(63) Continuation of application No. PCT/JP2005/012386, filed on Jul. 5, 2005.

(51) Int. Cl.
*H03K 9/00* (2006.01)
(52) U.S. Cl. ......... 375/316; 375/238; 375/239; 455/130
(58) Field of Classification Search .................. 375/345
See application file for complete search history.

(56) References Cited

U.S. PATENT DOCUMENTS

| 6,980,612 | B1 * | 12/2005 | Miyoshi ........................ 375/346 |
| 7,720,504 | B2 * | 5/2010 | Murata et al. ............. 455/550.1 |
| 2003/0100267 | A1 * | 5/2003 | Itoh et al. ........................ 455/69 |
| 2003/0142658 | A1 * | 7/2003 | Ofuji et al. ..................... 370/349 |
| 2004/0001472 | A1 * | 1/2004 | Kwak et al. ................... 370/342 |
| 2004/0017865 | A1 * | 1/2004 | Litwin et al. ................... 375/345 |
| 2004/0028121 | A1 * | 2/2004 | Fitton ........................... 375/144 |
| 2004/0185808 | A1 * | 9/2004 | Chow .......................... 455/127.2 |
| 2004/0264591 | A1 * | 12/2004 | Malm et al. .................... 375/261 |
| 2006/0019608 | A1 * | 1/2006 | Furuumi et al. ........... 455/67.15 |
| 2006/0262840 | A1 * | 11/2006 | Wang et al. ................... 375/221 |
| 2007/0147289 | A1 * | 6/2007 | Nibe ............................. 370/329 |
| 2007/0149149 | A1 * | 6/2007 | Nibe .......................... 455/115.1 |
| 2008/0043680 | A1 * | 2/2008 | Fitton .......................... 370/335 |

FOREIGN PATENT DOCUMENTS

| JP | 2003-229894 | 8/2003 |
| JP | 2004-186969 | 7/2004 |
| JP | 2004-320254 | 11/2004 |
| JP | 2005-057710 | 3/2005 |

OTHER PUBLICATIONS

Kengo Kurose, Yutaka Asanuma "A SIR estimation method for W-CDMA system" 2004 IEICE Communications Society Conference Koen Ronhunshu 1, p. 369.
3GPP TS 25.214. V6.2.0 (Jun. 2004); 3rd Generation Partnership Project; Technical Specification Group Radio Access Network; Physical layer procedures (FDD) (Release 6).
3GPP TS 25.212. V6.2.0 (Jun. 2004); 3rd Generation Partnership Project; Technical Specification Group Radio Access Network; Multiplexing and channel coding (FDD) (Release 6).
Shinichi Mori, Tetsuro Imai "Path Characteristics Measurement System with CPICH for W-CDMA" 2000 IEICE Communications Society Conference Koen Ronbunshu 1, p. 369.

* cited by examiner

*Primary Examiner* — Shuwang Liu
*Assistant Examiner* — Santiago Garcia
(74) *Attorney, Agent, or Firm* — Murphy & King, P.C.

(57) ABSTRACT

In a communication apparatus which transmits parameters corresponding to a reception environment to a transmitting apparatus which switches the transmission rate based on the reception environment, reception quality calculated in the past is saved as a first reception quality, and past CPICH symbols used in calculating this first reception quality are saved. Channel compensation of the saved past CPICH symbols is performed using a current channel estimation value, and the channel-compensated CPICH symbols are used to calculate a second reception quality; the difference between this second reception quality and the first reception quality is used as a reception quality correction value to correct reception quality.

11 Claims, 14 Drawing Sheets

US 8,073,077 B2

RECEPTION QUALITY CALCULATION METHOD, RECEPTION QUALITY CALCULATION APPARATUS, AND COMMUNICATION APPARATUS

CROSS-REFERENCE TO RELATED APPLICATIONS

This is a continuation application of International Application Number PCT/JP2005/012386, which was filed on Jul. 5, 2005.

BACKGROUND OF THE INVENTION

The present invention relates to a reception quality calculation method, a reception quality calculation apparatus, and to a communication apparatus, and in particular relates to a reception quality calculation method, a reception quality calculation apparatus, and to a communication apparatus in which reception quality is measured as a reception environment, and parameters (for example, CQI) corresponding to the reception environment are transmitted to the transmitting apparatus.

A W-CDMA (UMTS) mobile communication system is a wireless communication system in which circuits are shared among a plurality of users, and as shown in FIG. 6, comprises a core network 1, wireless base station control apparatuses (RNCs: Radio Network Controllers) 2 and 3, multiplex separation apparatuses 4 and 5, wireless base stations (Node B) $6_1$ to $6_5$, and a mobile station (UE: User Equipment) 7.

The core network 1 is a network used for routing within the mobile communication system; the core network can for example be configured using an ATM switched network, packet-switched network, router network, or similar. The core network 1 can also be connected with another public network (PSTN), so that a mobile station 7 can communicate with fixed-line telephone sets and similar as well.

The wireless base station control apparatuses (RNCs) 2 and 3 are positioned as higher-level apparatuses of the wireless base stations $6_1$ to $6_5$, and comprise functions for controlling these wireless base stations $6_1$ to $6_5$ and managing their wireless resources to be used and similar. Functions are also comprised by means of which, during handovers, signals from one mobile station 7 are received from a plurality of subordinate wireless base stations, and the data for which quality is better is selected and transmitted to the core network 1.

The multiplex separation apparatuses 4 and 5 are provided between RNCs and wireless base stations, and separate signals addressed to each of the wireless base stations received from the RNCs 2 and 3, and output the signals addressed to each of the wireless base stations; in addition, control is performed to multiplex signals from the wireless base stations and pass the signals to the RNCs.

The wireless base stations $6_1$ to $6_3$ are controlled by RNC 2, and the wireless base stations $6_4$ and $6_5$ are controlled by RNC 3, while performing wireless communication with the mobile station 7. By existing within the wireless area of the wireless base station 6, the mobile station 7 establishes a wireless circuit with the wireless base station 6, and communicates with other communication apparatuses via the core network 1.

The interface between the core network 1 and the RNCs 2 and 3 is called the Iu interface, the interface between the RNCs 2 and 3 is called the Iur interface, the interface between the RNCs 2, 3 and each of the wireless base stations 6 is called the Iub interface, and the interface between the wireless base stations 6 and mobile stations 7 is called the Uu interface; and a network formed by 2 to 6 apparatuses in particular is called a radio access network (RAN). Circuits between the core network 1 and the RNCs 2 and 3 are used in common by the Iu and Iur interfaces, and circuits between the RNCs 2, 3 and the multiplex separation apparatuses 4, 5 are used in common by Iub interfaces for a plurality of wireless base stations.

The above is an explanation of an ordinary mobile communication system; in addition, HSDPA (High Speed Downlink Packet Access) may be adopted as a technology enabling high-speed downlink data transmission (see Non Patent Documents 1 and 2). Here, a simple explanation of HSDPA is given.

Non Patent Document 1: 3G TS 25.212 (3rd Generation Partnership Project Technical Specification Group Radio Access Network; Multiplexing and channel coding (FDD))

Non Patent Document 2: 3G TS 25.214 (3rd Generation Partnership Project Technical Specification Group Radio Access Network; Physical layer procedures (FDD))

HSDPA

HSDPA employs an adaptive coding and modulation method (AMC: Adaptive Modulation and Coding), and has the feature of enabling adaptive switching between, for example, the QPSK modulation scheme and the 16QAM scheme, according to the wireless environment between the wireless base station and mobile station.

In addition, HSDPA employs the H-ARQ (Hybrid Automatic Repeat reQuest) method. In H-ARQ, when a mobile station detects an error in data received from a wireless base station, the mobile station transmits a resend request (NACK signal) to the wireless base station. Upon receiving this resend request, the wireless base station resends the data, and the mobile station uses both the data already received and the resent reception data to perform error correction decoding. Thus in H-ARQ, data already received can be used effectively even when errors occur, so that the gain of error correction decoding is increased, and consequently the number of resends can be reduced. When an ACK signal is received from the mobile station, data transmission has been successful and resending is unnecessary, and so the next data is transmitted.

The main wireless channels used in HSDPA are, as shown in FIG. 7, (1) HS-SCCH (High Speed-Shared Control Channel), (2) HS-PDSCH (High Speed-Physical Downlink Shared Channel), and (3) HS-DPCCH (High Speed-Dedicated Physical Control Channel).

HS-SCCH and HS-PDSCH are both shared channels in the downlink direction (that is, from the wireless base station to the mobile station); HS-SCCH is a control channel used to transmit various parameters relating to the data transmitted in the HS-PDSCH channel. In other words, HS-SCCH is a channel used for notification of data transmission in the HS-PDSCH. The various parameters may include, for example, address information for the mobile station to which data is transmitted from the base station, transmission bitrate information, modulation method information indicating the modulation method used to transmit data using HS-PDSCH, the number of spreading codes allocated (number of codes), rate-matching patterns for transmitted data, and similar.

On the other hand, HS-DPCCH is a dedicated control channel in the uplink direction (that is, from the mobile station to the wireless base station), and is used when the mobile station transmits reception results (ACK signals, NACK signals) to the wireless base station according to the presence or absence of errors in data received via HS-PDSCH. That is, this channel is used when transmitting reception results for data received over HS-PDSCH. When the mobile station fails in data reception (when the reception data results in a CRC error, or similar), a NACK signal is transmitted from the mobile station, and so the wireless base station executes resend control.

In addition, HS-DPCCH is used by the mobile station, which has measured the reception quality (for example, SIR value) of signals received from the wireless base station, to transmit the reception quality, as a CQI (Channel Quality Indicator), to the wireless base station. In other words, the CQI is information used by the mobile station to report the reception environment to the base station, and takes the values CQI=1 to 30; the CQI for which the block error rate BLER in the reception environment does not exceed 0.1 is reported to the base station.

The wireless base station uses the received CQI to judge the acceptability of the downlink-direction wireless environment, and if satisfactory, switches to a modulation method enabling transmission at faster data rates; that is, if the environment is not acceptable, the modulation method is switched to a slower data transmission method (that is, adaptive modulation is performed). In actuality, the base station has a CQI table which defines formats with different transmission rates according to a CQI value of 1 to 30, uses the CQI table to determine the parameters (transmission rate, modulation method, number of multiplex codes, and similar) according to the CQI value, and uses HS-SCCH to notify the mobile station, while transmitting data over HS-PDSCH based on these parameters.

Channel Structure

FIG. 8 explains timing in the HSDPA system. In W-CDMA, code-division multiplexing is used, and so channels are separated by codes. The CPICH (Common Pilot Channel) and SCH (Synchronization Channel) are both shared channels in the downlink direction. CPICH is used by mobile stations for channel estimation, cell searching and similar, and is a channel used for transmission of so-called pilot signals. SCH comprises, more precisely, P-SCH (Primary SCH) and S-SCH (Secondary SCH), and are channels for transmission in burst mode with 256 chips at the beginning of each slot. SCH data is received by a mobile station performing three-stage cell searching, and is used to establish slot synchronization and frame synchronization, and to identify base station codes (scramble codes). SCH is 1/10 the length of one slot, but is shown as more broad in the figure. The remaining 9/10 is the P-CCPCH (Primary-common control physical channel).

Next, channel timing relations are explained. In each channel, one frame (10 ms) comprises 15 slots, and one frame is of length equivalent to 2560 chips. As explained above, CPICH is used as reference for other channels, and so the frame beginning in SCH and HS-SCCH coincides with the frame beginning in CPICH. On the other hand, the frame beginning in HS-PDSCH is delayed by two slots relative to HS-SCCH and similar; this is in order to enable the mobile station to perform demodulation of HS-PDSCH using the demodulation method corresponding to the modulation method after receiving modulation method information via HS-SCCH. In HS-SCCH and HS-PDSCH, one subframe comprises three slots.

HS-DPCCH is an uplink channel, the first slot in a subframe of this channel is used to transmit ACK/NACK signals, indicating the HS-PDSCH reception result, from the mobile station to the wireless base station after approximately 7.5 slots have elapsed from reception of HS-PDSCH. The second and third slots are used to periodically transmit feedback CQI information to the base station for use in adaptive modulation control. Here, the transmitted CQI information is computed based on the reception environment (for example, the CPICH SIR measurement results) measured over the interval from four slots before CQI transmission to one slot before CQI transmission.

Mobile Station Configuration

FIG. 9 shows the configuration of principal portions of a mobile station of the prior art. Wireless signals transmitted from a base station are received by the antenna and input to the receiver 1. The receiver 1 down-converts the wireless signals to baseband signals, and then performs quadrature demodulation, AD conversion, despreading, and other processing of the baseband signals, and outputs HS-PDSCH symbol signals, CPICH symbol signals, reception timing signals (frame sync, slot sync signals), and similar. The HS-PDSCH channel estimation filter 2 calculates the average value of CPICH symbol signals for the n symbols preceding the current symbol, for example 10 symbols, and for the next 10 symbols including the current symbol, for a total of 20 symbols, and outputs the average value as a channel estimation value in sequence at symbol periods. One CPICH slot comprises 10 symbols, and so the above 10 symbols are equivalent to one slot.

FIG. 10 explains operation of the HS-PDSCH channel estimation filter 2; the first symbol channel estimation value for the current slot# n is the average value of CPICH symbol signals for the 20 symbols which are the first through tenth symbols of the previous slot# n−1 and the first through tenth symbols of the current slot# n. The second symbol channel estimation value for the current slot# n is the average value of the CPICH symbol signals for the 20 symbols which are the second through tenth symbols of the previous slot# n−1, the first through tenth symbols of the current slot# n, and the first symbol of the next slot# n+1. Similarly, the channel estimation value at the tenth symbol of the current slot# n is the average value of the CPICH symbol signals of the 20 symbols which are the tenth symbol of the previous slot# n−1, the first through tenth symbols of the current slot# n, and the first through ninth symbols of the next slot# n+1. In this way, by calculating channel estimation average values for a plurality of symbols on both sides and using the result as the channel estimation value for the center symbol, high-precision channel estimation is possible.

In order to clarify the fact that the channel estimation value for the center symbol is obtained by calculating the average of a plurality of channel estimation values on both sides, FIG. 10 shows channel estimation and channel compensation processing being performed in slot# n. However, in actuality, channel estimation and channel compensation processing are performed in slot# n+1, as shown in FIG. 11.

Returning to FIG. 9, the HS-PDSCH symbol buffer 3 holds HS-PDSCH symbols for one slot interval, and inputs the symbols to the HS-PDSCH channel compensation processing portion 4. That is, HS-PDSCH symbols are input to the HS-PDSCH channel compensation processing portion 4 with a delay of one slot interval, until the channel estimation value is determined. The HS-PDSCH channel compensation processing portion 4 uses channel estimation values to perform channel compensation processing of HS-PDSCH symbol signals with a one-slot delay, as shown in the bottom of FIG. 11. The demodulation processing portion 5 uses channel-compensated symbol signals to demodulate HS-PDSCH symbols, and the decoding processing portion 6 performs error-correction decoding of the demodulated signals; the CRC computation portion 7 performs CRC computation to determine whether errors exist in the decoded results for each block, and if no errors are detected outputs the decoded data and generates an ACK, but if errors are detected generates a NACK, which is input to the HS-DPCCH generation portion 13.

The CPICH channel estimation filter for SIR calculation 8 calculates the average value of CPICH symbol signals for the immediately preceding 20 symbols including the current symbol, and outputs the averages as channel estimation values in sequence at symbol periods. FIG. 12 explains operation of the CPICH channel estimation filter 8; the channel estimation value for the first symbol of the current slot# n is the average value of CPICH symbol signals for the 20 symbols which are the second through tenth symbols of two slots previous, slot# n−2, the first through tenth slots of the previous slot# n−1, and the first symbol of the current slot# n. The channel estimation value of the second symbol of the current slot# n is the average value of CPICH symbol signals for the 20 symbols which are the third through tenth symbols of two slots previous, slot# n−2, the first through tenth slots of the previous slot# n−1, and the first and second symbols of the current slot# n. Similarly, the channel estimation value of the tenth symbol of the current slot# n is the average value of CPICH symbol signals for the 20 symbols which are the first through tenth slots of the previous slot# n−1, and the first through tenth symbols of the current slot# n. The reason why the CPICH channel estimation filter for SIR calculation 8 cannot use CPICH symbol signals for the 20 symbols which are the immediately preceding 10 symbols and the next 10 symbols including the current symbol, as in the case of the HS-PDSCH channel estimation filter 2, is explained later.

Returning to FIG. 9, the CPICH channel compensation processing portion 9 for SIR calculation uses the CPICH channel estimation values for SIR calculation to perform channel compensation processing of CPICH symbol signals, as shown at the bottom of FIG. 12, the demodulation processing portion 10 uses the channel-compensated symbol values to demodulate the CPICH symbols, and the CPICH-SIR calculation processing portion 11 uses the demodulated CPICH symbols to perform well-known SIR calculation processing, and outputs CPICH-SIR values which indicate the reception environment for the mobile station.

The CPICH-SIR-CQI report value conversion portion 12 comprises a CPICH-SIR and CQI correspondence table, as shown in FIG. 13, and determines CQI report values corresponding to input CPICH-SIR values from this table, for input to the HS-DPCCH generation portion 13.

In parallel with the above, the downlink reception timing monitoring portion 14 monitors the downlink timing based on reception timing signals (frame sync, slot sync signals), and the uplink transmission timing management portion 15 inputs transmission timing signals to the HS-DPCCH generation portion 13. The HS-DPCCH generation portion 13 generates HS-DPCCH signals, comprising CQI report values corresponding to the CPICH-SIR values for the previous fourth through first slots (in the example of FIG. 9, the CPICH-SIR for the second and first previous slots) for each subframe, as explained in FIG. 8, and comprising ACK/NACK signals as appropriate; the coding processing portion 16 performs encoding and inputs the result to the modulation processing portion 17. The modulation processing portion 17 performs spreading processing, DA conversion, and quadrature modulation, and the transmitter 18 frequency-converts the baseband signals to RF signals and transmits the signals via the antenna toward the base station. Although not shown, the base station demodulates the HS-DPCCH signals, and based on the CQI report value determines the transport block size, number of multiplex codes, modulation method and similar from the CQI table, and based on these values HS-PDSCH data is transmitted, and resend control based on ACK/NACK signals is performed.

As explained above, by delaying the HS-PDSCH symbols by one slot, the HS-PDSCH channel estimation filter 2 calculates the average value of CPICH symbol signals for a total of 20 symbols, including the 10 symbols immediately preceding the current symbol and the next 10 symbols including the current symbol, and can use this average value as the channel estimation value for the current symbol, so that high-precision channel estimation is possible. On the other hand, the CPICH channel estimation filter 8 for SIR calculation cannot calculate the channel estimation value using the next 10 symbols including the current symbol, as in the case of the HS-PDSCH channel estimation filter 2. This is because the CQI report value must be determined and transmitted for the current slot using the SIR measured based upon three slots' worth of CPICH symbols, which are previous fourth through first slots from the current slot, thereby the CPICH symbols for SIR calculation cannot be delayed for use in channel estimation.

From the above, the CPICH channel estimation filter 8 for SIR calculation calculates the average values of CPICH symbol signals for the immediately preceding 20 symbols including the current symbol, and outputs the average values in sequence as channel estimation values at symbol periods. This means that, as for example the channel estimation value for the first symbol of the current slot# n, the channel estimation value of the first symbol of the previous slot# n−1 is used. For this reason, a channel estimation value not suited to the first symbol of the current slot# n is calculated, and so the precision of the CPICH channel estimation value for SIR calculation is reduced compared with the HS-PDSCH channel estimation value. This effect is particularly prominent in an environment in which the channel estimation result changes in a short period of time due to rapid fading or for other reasons, so that past channel estimation values and current channel estimation values are different. That is, in an environment with rapid fading, the precision of CPICH channel estimation values for SIR calculation is reduced substantially compared with HS-PDSCH channel estimation values, and so the reception quality of CPICH symbols for SIR calculation is degraded considerably relative to the reception quality of HS-PDSCH symbols.

FIG. 14 is a graph showing quantitatively the HS-PDSCH block error rate (BLER) versus fading rate characteristic during fixed-format reception; FIG. 15 is a graph showing quantitatively the CPICH-SIR versus fading rate characteristic; and FIG. 16 is a graph showing the CQI report value versus fading rate when CPICH-SIR is converted to CQI report values using a technique of the prior art. Here, "fixed-format reception" means reception during transmission with the block size, modulation method, and number of multiplexing code channels fixed.

As is clear from FIG. 14 and FIG. 15, as the fading rate increases the CPICH reception quality for SIR calculation is degraded compared with the HS-PDSCH reception quality. As a result, as shown in FIG. 16, during rapid fading, CQI report values are reported to be low compared with the intrinsic CQI report values. As a result, in an environment in which high-quality HS-PDSCH data transmission/reception is possible even using a format with high transmission rate and low error-correcting capability, the base station transmits data to the mobile station over HS-PDSCH using a format with a low transmission rate and high error-correcting capability. As a result, the HS-PDSCH block error rate BLER is substantially lower than the stipulated value of 0.1; that is, quality is excessively high, and the communication system throughput characteristic is degraded.

SUMMARY OF THE INVENTION

In light of the above, an object of this invention is to accurately calculate the HS-PDSCH reception quality, even when a fading environment prevails.

A further object of the invention is to accurately calculate the HS-PDSCH reception quality, even when a fading environment prevails, and to determine the CQI corresponding to this reception quality, and report the result to the transmitting apparatus.

A further object of the invention is to enable a transmission apparatus to transmit data at a transmission rate accordingly to the accurately determined HS-PDSCH reception quality.

This invention relates to a reception quality calculation method, reception quality calculation apparatus, and reception apparatus, which estimate the current channel using past CPICH symbols, perform channel compensation of current CPICH symbols based on the obtained channel estimation value, and calculates reception quality using the channel-compensated CPICH symbols.

A reception quality calculation method of this invention comprises a step of saving reception quality calculated in the past as a first reception quality, and of saving past CPICH symbols used in calculating the first reception quality; a step of performing channel compensation of the past CPICH symbols which have been saved using a current channel estimation value, and of calculating a second reception quality using the channel-compensated CPICH symbols; a step of determining the difference between the second reception quality and the saved first reception quality, as a reception quality correction value; a step of performing channel compensation of the current CPICH symbols using the current channel estimation value, and calculating a third reception quality using the CPICH symbols obtained; and a step of correcting the third reception quality using the correction value.

The above reception quality calculation method of the invention has a step, when reception quality is measured with a prescribed period, of regarding the third reception quality as a first reception quality and the current CPICH symbols as past CPICH symbols, and of performing the next reception quality correction processing using the first reception quality and the past CPICH symbols. Further, a reception quality calculation method of this invention has a step, when the reception quality is measured with a prescribed period, of estimating the channel in the current measurement period using the past two periods' worth of CPICH symbols.

A reception quality calculation apparatus of this invention comprises a storage portion, which saves the reception quality calculated in the past as a first reception quality, and which saves past CPICH symbols used in calculating the first reception quality; a channel compensation portion, which performs channel compensation of the saved past CPICH symbols using a current channel estimation value; a first reception quality calculation portion, which calculates a second reception quality for correction using the channel-compensated CPICH symbols; a correction value computation portion, which outputs, as a reception quality correction value, the difference between the second reception quality and the saved first reception quality; a second reception quality calculation portion, which calculates a third reception quality using CPICH symbols which are obtained by performing channel compensation of current CPICH symbols using the current channel estimation value; and a reception quality correction portion, which corrects the third reception quality using the correction value.

When the reception quality is measured with a prescribed period, the above reception quality calculation apparatus of this invention further has means which, when reception quality is measured with a prescribed period, the third reception quality as a first reception quality and the current CPICH symbols as past CPICH symbols respectively, and stores these respective quantities in the storage portion. Also, when the reception quality is measured with a prescribed period, a reception quality calculation apparatus of this invention has a channel estimation portion, which estimates the channel in the current measurement period using the past two periods' worth of CPICH symbols.

A communication apparatus of this invention transmits parameters, according to the reception environment, to a transmitting apparatus which switches the transmission rate based on the reception environment, and comprises a storage portion, which stores reception quality calculated in the past as a first reception quality, as well as past CPICH symbols used in calculating the first reception quality; a channel estimation portion, which, when reception quality is measured with a prescribed period, estimates the channel in the current measurement period using two periods' worth of past CPICH symbols; a channel compensation portion, which performs channel compensation of the saved past CPICH symbols using the current channel estimation value; a first reception quality calculation portion, which calculates a second reception quality for correction using the channel-compensated CPICH symbols; a correction value computation portion, which outputs, as a reception quality correction value, the difference between the second reception quality and the saved first reception quality; a second reception quality calculation portion, which calculates a third reception quality using CPICH symbols which are obtained by performing channel compensation of current CPICH symbols using the current channel estimation value; a reception quality correction portion, which corrects the third reception quality using the correction value; a parameter acquisition portion, which acquires parameters according to the corrected reception quality; and a transmission portion, which transmits the parameters to the transmission apparatus.

By means of this invention, HS-PDSCH reception quality can be accurately calculated even in a fading environment, and the CQI can be determined based on this reception quality and can be reported to the transmission apparatus, so that the transmission apparatus can transmit data at a transmission rate according to the HS-PDSCH reception quality; moreover, by means of this invention, the throughput of the communication system can be improved, without excessively high quality.

DESCRIPTION OF THE PREFERRED EMBODIMENTS

(A) Reception Quality Calculation Processing of the Invention

Figure 1:
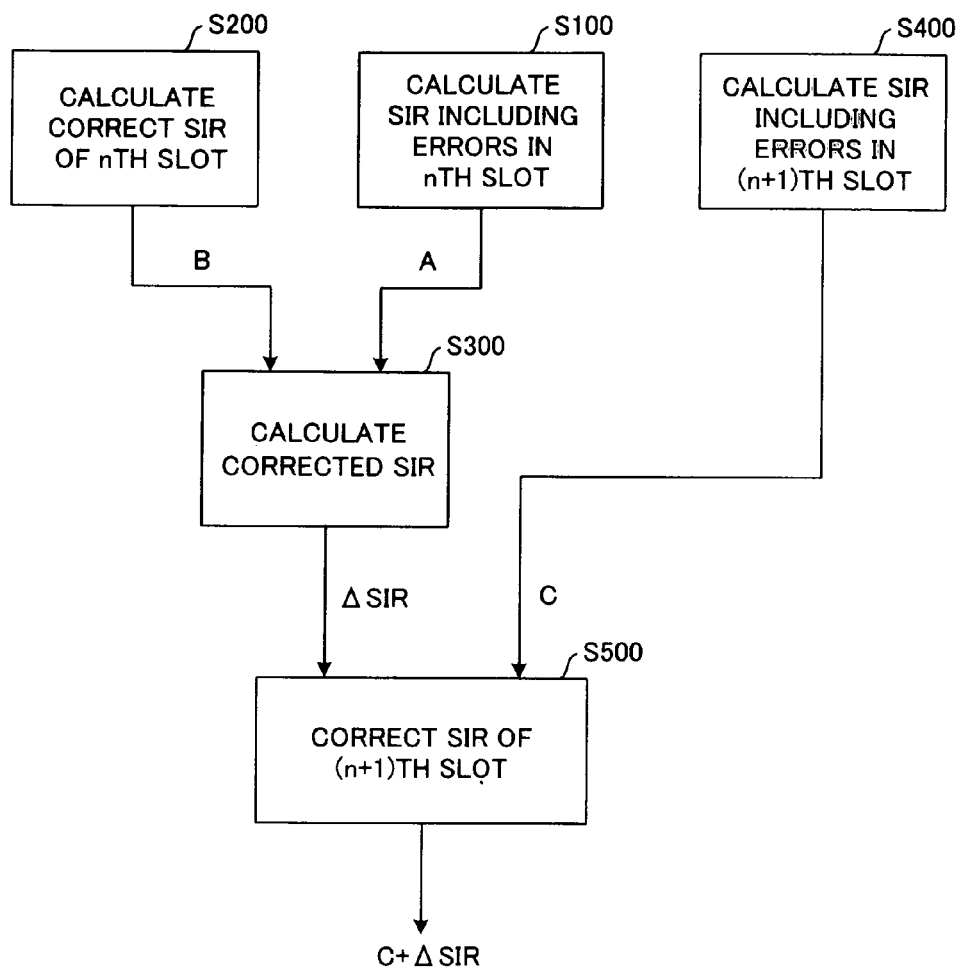
FIG. 1 shows in summary the processing flow of a reception quality calculation method of the invention.

FIG. 1 shows in summary the processing flow of a reception quality calculation method of this invention.

If reception quality, such as for example the signal-to-interference ratio (SIR) is measured with the slot period, then the reception quality (first reception quality) A including errors in the nth slot is calculated (step S100), the correct reception quality (second reception quality) B not including errors in the nth slot is calculated (step S200), and the difference between the first reception quality A and the second reception quality B is calculated as the correction SIR ($=\Delta SIR$) (step S300). Then, the reception quality (third reception quality) C including errors in the (n+1)th slot is calculated (step S400), and the equation $$SIR = C + \Delta SIR$$

is used to correct the third reception quality C and output the result (step S500).

Figure 2:
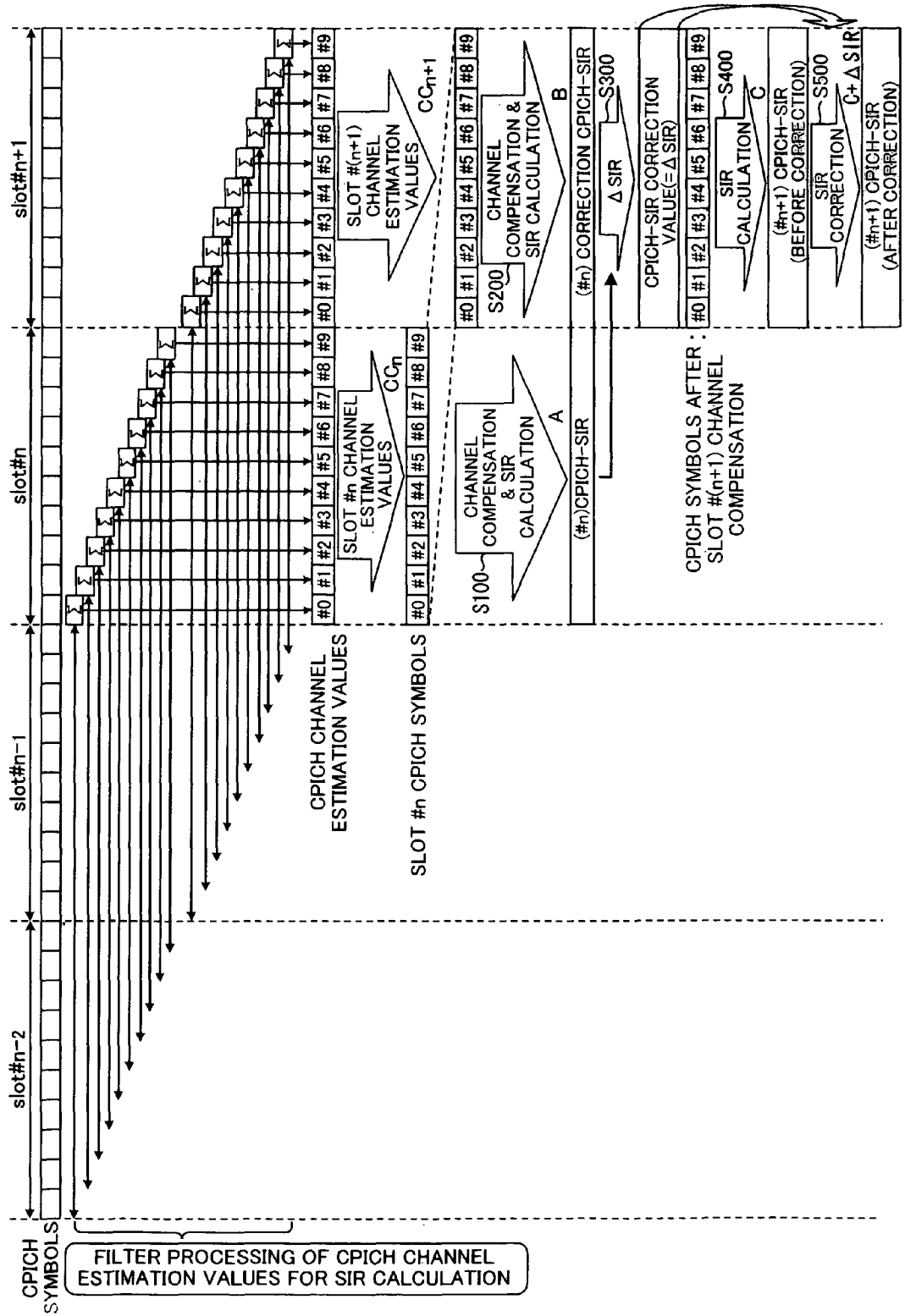
FIG. 2 explains reception quality correction processing of the invention.

FIG. 2 explains reception quality correction processing of this invention.

When reception quality is measured with the slot period, at the current symbol of slot# n the channel is estimated using CPICH symbols for the past two periods (20 symbols' worth). That is, the average value of CPICH symbol signals for the immediately preceding 20 symbols, including the current symbol, is calculated, and the average value is output in sequence with the symbol period as the channel estimation value for the current symbol. For example, the channel estimation value for the first symbol of slot# n is calculated using CPICH symbol signals for the 20 symbols which are the second through tenth symbols of two slots previous, slot# n−2, the first through tenth symbols of the previous slot# n−1, and the first symbol of slot# n.

As explained above, the channel is estimated for the current symbol timing using CPICH symbols for the preceding 20 symbols, so that the calculated channel estimation value CCn is not the accurate channel estimation value for the current symbol timing, but instead is the channel estimation value for the center symbol of the 20 symbols, that is, the channel estimation value for the symbol timing for one slot before (10 symbols before).

When the current CPICH symbol in slot# n is subjected to channel compensation using this channel estimation value CCn, the channel-compensated CPICH symbols are used to calculate the reception quality A (step S100). However, because the channel estimation value CCn is the value for the symbol timing of one slot before, as explained above, correct channel compensation is not performed, and the reception quality A contains an error. The symbols of slot# n are stored in a buffer.

Next, if the channel is similarly estimated for the current symbol timing in slot# n+1, then the channel estimation value CCn+1 indicates the channel estimation value at the symbol timing of slot# n, one slot previous. If this channel estimation value CCn+1 is used to compensate the CPICH symbols of the slot# n of one slot previous, saved to the buffer, then correct channel compensation has been performed. If these channel-compensated CPICH symbols are used to calculate the reception quality B (step S200), then the reception quality B is ideally the correct SIR, not containing errors.

Using the equation $$B - A = \Delta SIR \qquad (1)$$

the difference between the first reception quality A and the second reception quality B is calculated as the correction value ($=\Delta SIR$) (step S300). This correction value ($=\Delta SIR$) changes between slot periods, but the change is small, and the value is substantially constant.

On the other hand, at the same time as the above processing to calculate the correction value $\Delta SIR$, the current channel estimation value CCn+1 is used to perform channel compensation of the current CPICH symbols in slot# n+1, and these channel-compensated CPICH symbols are used to calculate reception quality C (step S400). Because the channel estimation value CCn+1 is the value for the symbol timing slot# n of one slot previous, as explained above, correct channel compensation is not performed, and the reception quality C includes an error.

Hence the following equation $$SIR = C + \Delta SIR \qquad (2)$$

is used to correct the reception quality C, which is output (step S500). The correction value ($=\Delta SIR$) changes between slot periods, but the change is small, and the value is substantially constant, and so the above equation can be used to accurately correct the reception quality.

The CPICH symbols in slot# n+1 are saved to the buffer, and thereafter reception quality correction processing similar to that described above is performed.

(B) Configuration of the Mobile Station

Figure 3:
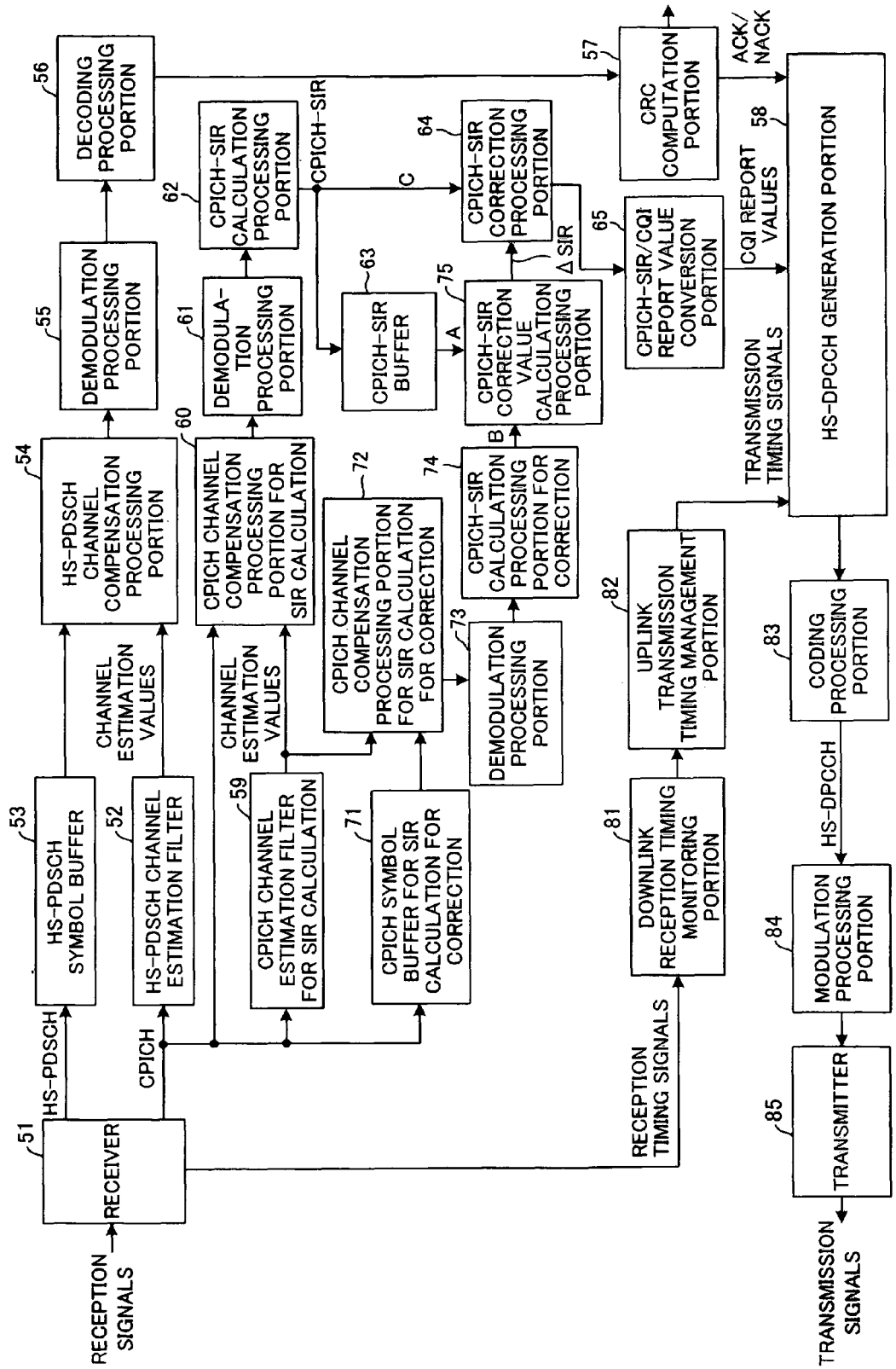
FIG. 3 shows the configuration of the mobile station of a first embodiment.

FIG. 3 shows the configuration of a mobile station.

Wireless signals transmitted from a base station are received by the antenna and input to the receiver 51. The receiver 51 down-converts the wireless signals to baseband signals, and subjects the baseband signals thus obtained to quadrature demodulation, AD conversion, and despreading processing, and outputs HS-PDSCH symbol signals, CPICH symbol signals, reception timing signals (frame sync, slot sync signals), and similar.

Figure 10:
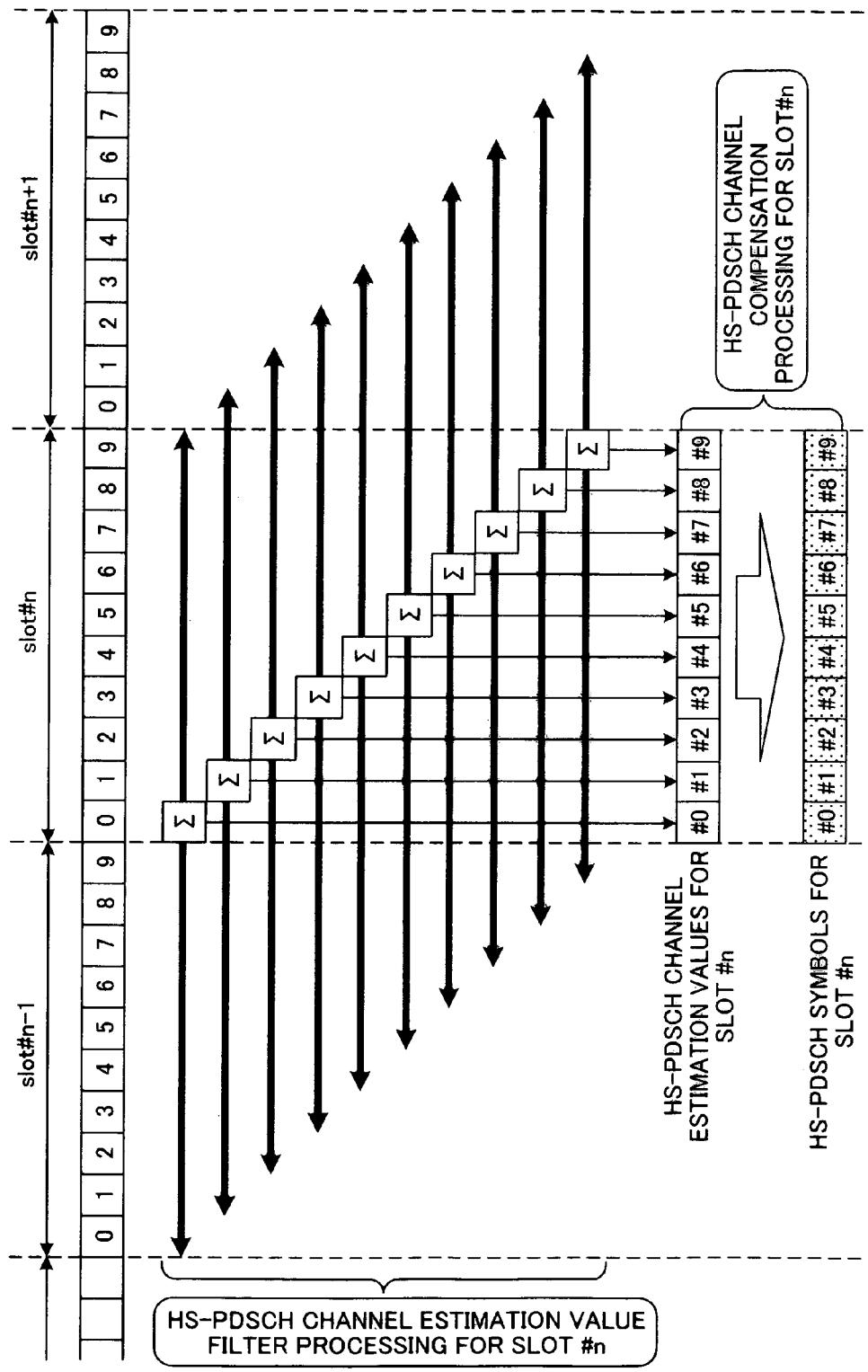
FIG. 10 is a drawing which explains HS-PDSCH channel estimation.
Figure 11:
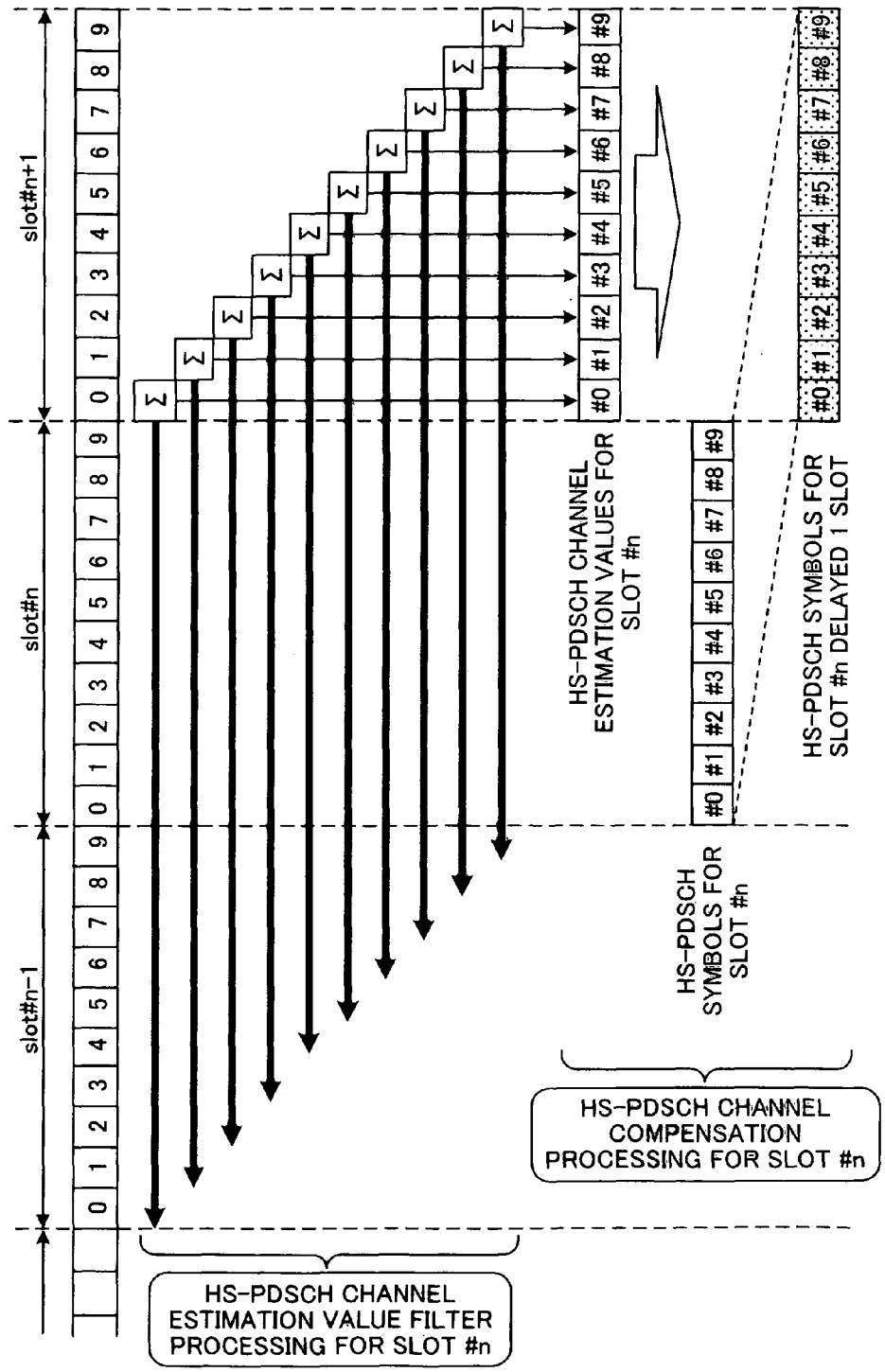
FIG. 11 is another drawing which explains HS-PDSCH channel estimation.

The HS-PDSCH channel estimation filter 52 calculates the average value of CPICH symbol signals for the N symbols preceding the current symbol of slot# n, such as for example 10 symbols, as well as the next 10 symbols, including the current symbol, for a total of 20 symbols, and outputs the average values as channel estimation values in sequence with the symbol period (see FIG. 10).

The HS-PDSCH symbol buffer 53 saves one slot interval (ten symbol intervals) of HS-PDSCH symbols, and inputs the symbols to the HS-PDSCH channel compensation processing portion 54. That is, the channel estimation value can be determined, and so the HS-PDSCH symbols are delayed by one slot interval, and are input to the HS-PDSCH channel compensation processing portion 54. The HS-PDSCH channel compensation processing portion 54 uses the channel estimation value calculated by the HS-PDSCH channel estimation filter 52 to perform channel compensation processing of HS-PDSCH symbol signals, and outputs the results. The demodulation processing portion 55 uses the channel-compensated symbol signals to demodulate the HS-PDSCH symbols, and the decoding processing portion 56 performs error-correction decoding of the demodulated signals; the CRC computation portion 57 performs CRC computation to determine whether errors exist in the decoded results for each transport block, and if no errors are detected, outputs the decoded data and generates an ACK signal; if errors are detected, a NACK signal is generated and is input to the HS-DPCCH generation portion 58.

Figure 12:
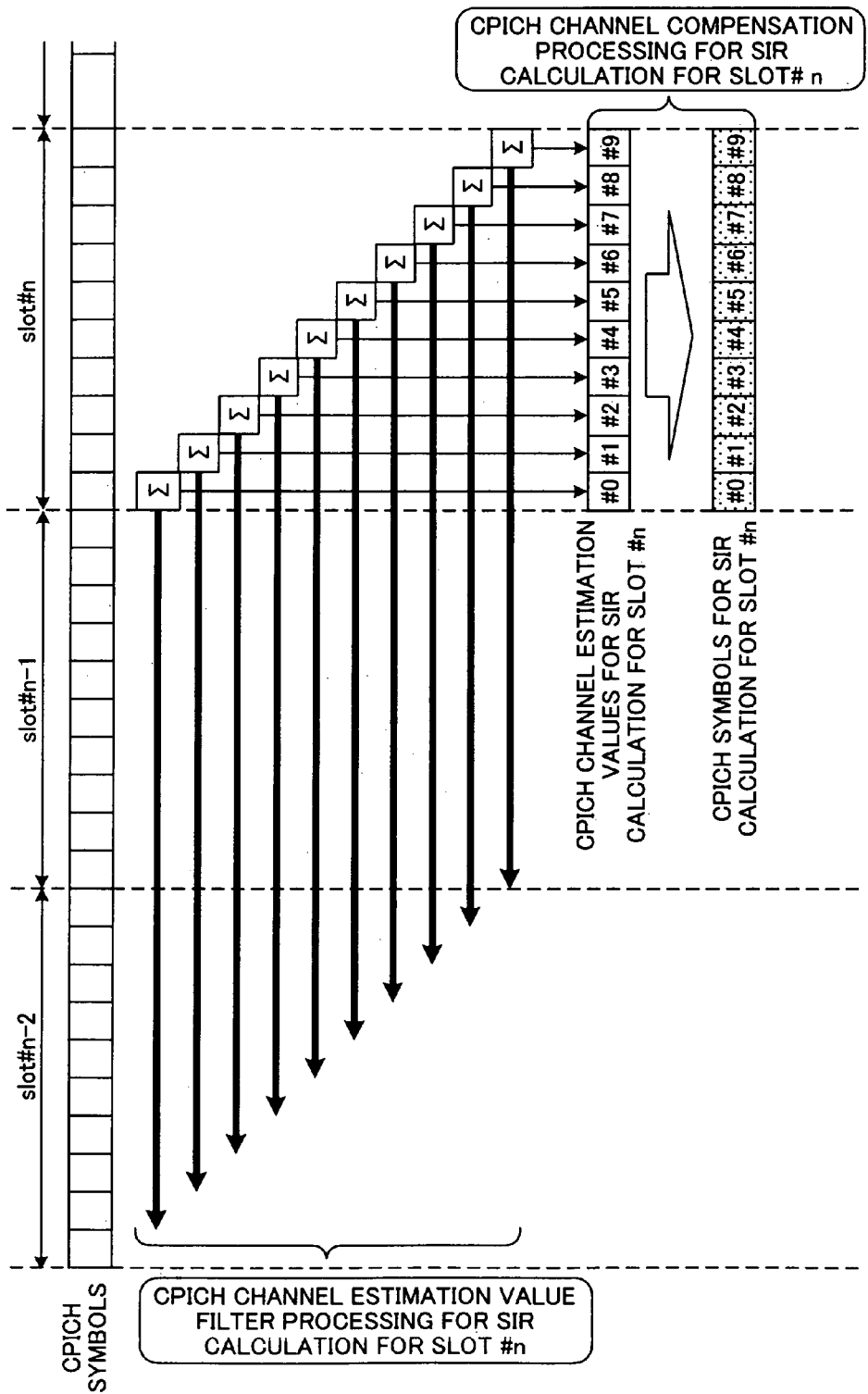
FIG. 12 explains CPICH channel estimation for SIR calculation of the prior art.

The CPICH channel estimation filter 59 for SIR calculation calculates the average value of CPICH symbol signals for the immediately preceding 20 symbols, including the current symbol of slot# n, and outputs in sequence the average values as channel estimation values CCn for SIR calculation, with the symbol period (see FIG. 12). The SIR calculation CPICH channel compensation processing portion 60 uses the CPICH channel estimation values for SIR calculation to perform channel compensation processing of CPICH symbol signals, and the demodulation processing portion 61 uses the channel-compensated symbol signals to perform CPICH symbol demodulation, while the CPICH-SIR calculation processing portion 62 uses the demodulated CPICH symbols to perform well-known SIR calculation processing, to calculate and output SIR (CPICH-SIR) values as the CPICH reception quality A (S100). The CPICH-SIR buffer 63 saves the reception quality CPICH-SIR A output from the CPICH-SIR calculation processing portion 62 for use in calculating the correction value $\Delta SIR$ in the next measurement period slot# n+1. The saved reception quality CPICH-SIR becomes the reception quality A explained in FIG. 1 and FIG. 2. Also, the CPICH symbols of slot# n are saved in the symbol buffer 71 for use in calculating the correction value $\Delta SIR$ in the next measurement period slot# n+1.

The CPICH-SIR correction processing portion 64 performs SIR correction processing of the reception quality CPICH-SIR C output from the CPICH-SIR calculation processing portion 62, using the correction value ($=\Delta SIR$) output from the CPICH-SIR correction value calculation processing portion 75, and outputs the correction result. Details of the reception quality correction control are explained using the processing for the next slot# n+1.

Figure 13:
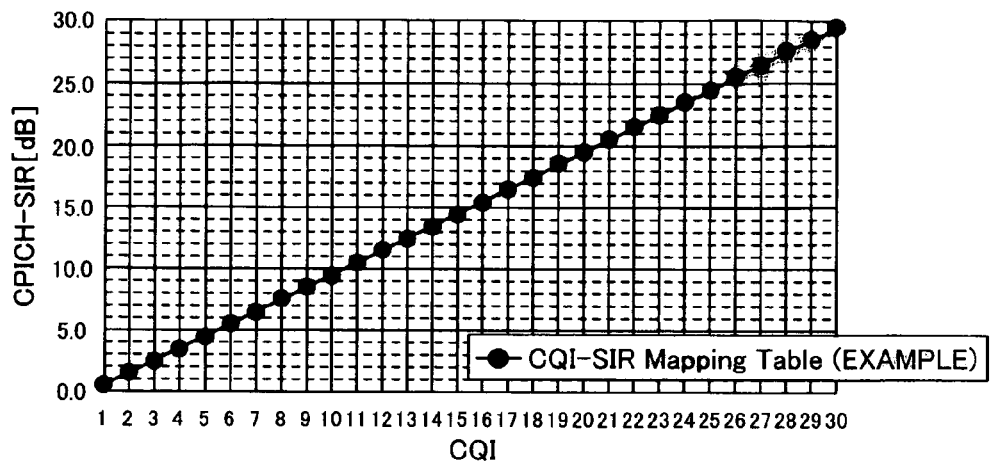
FIG. 13 is a conversion table for converting CPICH-SIR to CQI report value.
Figure 14:
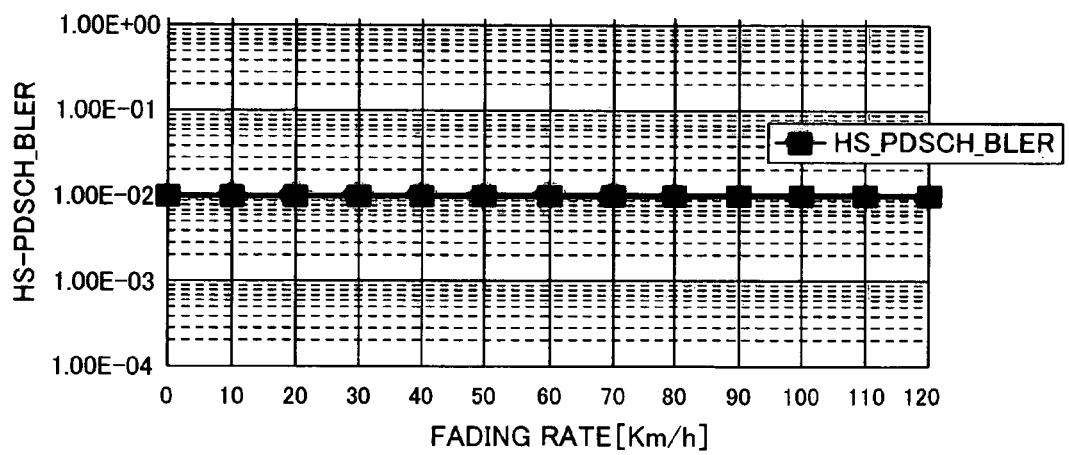
FIG. 14 is a graph showing quantitatively a HS-PDSCH block error rate (BLER) versus fading rate characteristic during fixed-format reception.
Figure 15:
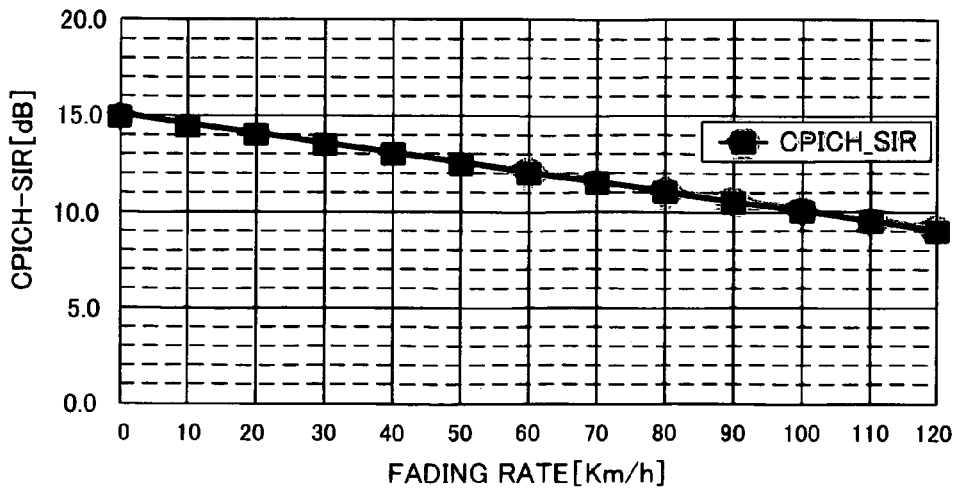
FIG. 15 is a graph showing quantitatively a CPICH-SIR versus fading rate characteristic; and, FIG. 16 is a graph showing the CQI report value versus fading rate when the CPICH-SIR values are converted to the CQI report value, using a technique of the prior art.
Figure 16:
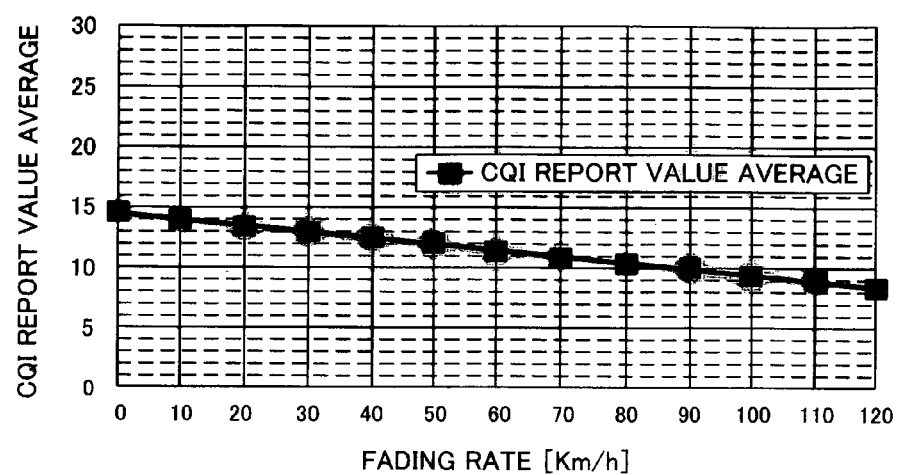

When the corrected CPICH-SIR is input, the CPICH-SIR/CQI report value conversion portion 65 uses a conversion table (see FIG. 13) to determine the CQI report value corresponding to the corrected CPICH-SIR, and inputs this value to the HS-DPCCH generation portion 58.

Figure 8:
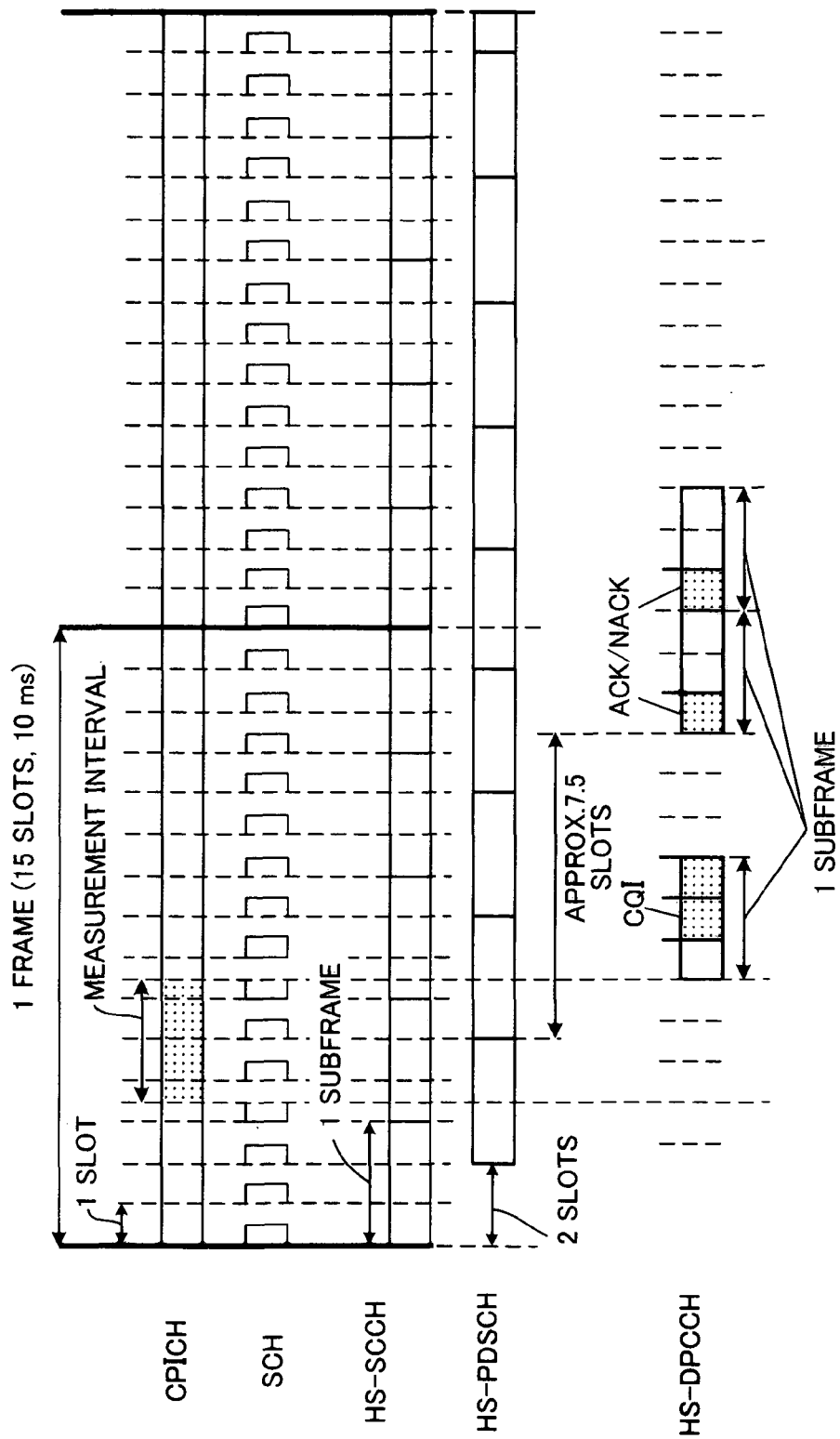
FIG. 8 explains channel timing in an HSDPA system.
Figure 9:
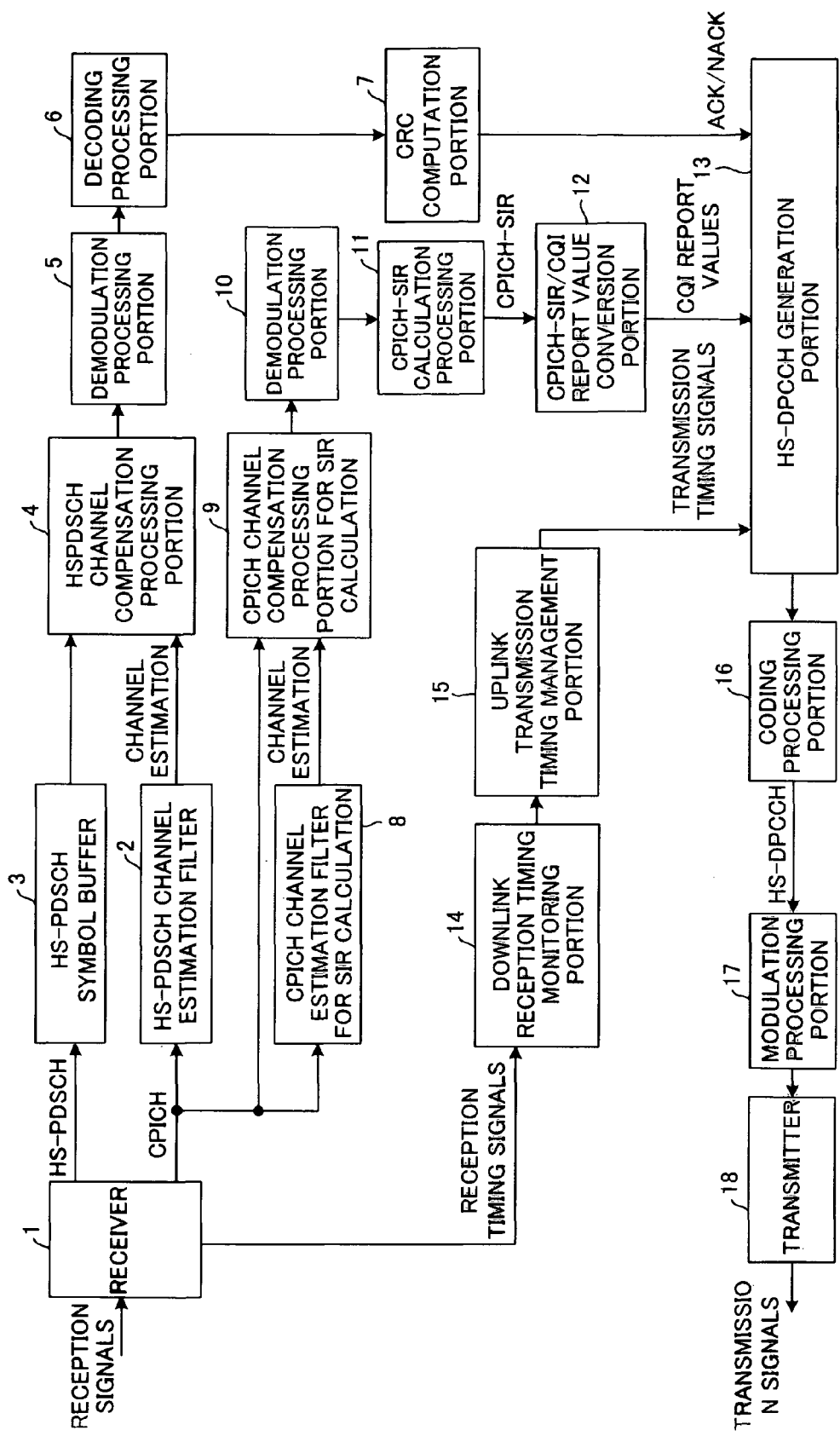
FIG. 9 shows the configuration of principal portions of a mobile station of the prior art.

The downlink reception timing monitoring portion 81 monitors downlink timing based on reception timing signals (frame sync, slot sync signals), and the uplink transmission timing management portion 82 inputs transmission timing signals into the HS-DPCCH generation portion 58. For each subframe the HS-DPCCH generation portion 58 creates HS-DPCCH signals comprising CQI report values corresponding to the CPICH-SIR values for the fourth through first previous slots, as explained using FIG. 8, and also comprises ACK/NACK signals as appropriate; these are encoded by the coding processing portion 83, and the result is input to the modulation processing portion 84. The modulation processing portion 84 performs spreading processing, DA conversion, and quadrature modulation, and the transmitter 85 frequency-converts the baseband signals into RF signals, which are transmitted from the antenna toward the base station.

Next, in slot# n+1, the units 52 through 57 related to HS-PDSCH symbols operate similarly to the case of slot# n. On the other hand, the CPICH channel estimation filter 59 for SIR calculation calculates the average values of CPICH symbols for the preceding 20 symbols including the current symbol of slot# n+1, and outputs in sequence the average values as channel estimation values $CC_{n+1}$ for SIR calculation with the symbol period (see FIG. 2). The SIR calculation CPICH channel compensation processing portion 60 uses the CPICH channel estimation values for $CC_{n+1}$ SIR calculation to perform channel compensation processing of CPICH symbol signals, the demodulation processing portion 61 uses the channel-compensated symbol signals to demodulate CPICH symbols, and the CPICH-SIR calculation processing portion 62 uses demodulated CPICH symbols to perform SIR calculation processing, to calculate and output the SIR (CPICH-SIR) value, which is the CPICH reception quality c (S400). This reception quality CPICH-SIR becomes the reception quality C explained in FIG. 1 and FIG. 2.

The CPICH channel compensation processing portion 72 for correction SIR calculation for correction uses the channel estimation values $CC_{n+1}$ for slot# n+1 to perform channel compensation of the slot# n CPICH symbols saved to the symbol buffer 71, the demodulation processing portion 73 uses the channel-compensated symbol signals to demodulate the slot# n CPICH symbols, and the CPICH-SIR calculation processing portion 74 for correction uses the channel-compensated CPICH symbols to perform SIR calculation processing, to calculate and output the slot# n CPICH reception quality CPICH-SIR B (S200). This reception quality CPICH-SIR is the reception quality B explained in FIG. 1 and FIG. 2.

The CPICH-SIR correction value calculation processing portion 75 uses the equation $$B - A = \Delta SIR$$

to calculate the difference between the reception quality CPICH-SIR for the previous slot# n (reception quality A), stored in the CPICH-SIR buffer, and reception quality B, and outputs the result as the correction value ($=\Delta SIR$, S300). The CPICH-SIR correction processing portion 64 corrects the reception quality CPICH-SIR output from the CPICH-SIR calculation processing portion 62 (equivalent to the reception quality C in FIG. 1 and FIG. 2) using the following equation, $$SIR = C + \Delta SIR$$

in use of the correction value ($=\Delta SIR$) and outputs the result (S500). The corrected CPICH-SIR can be regarded as the accurate reception quality SIR for HS-PDSCH symbols, even in a fading environment.

CPICH symbols in slot# n+1 are saved to the symbol buffer 71, and the reception quality CPICH-SIR output from the CPICH-SIR calculation processing portion 62 is stored in the CPICH-SIR buffer 63, to become the reception quality A in the next correction processing.

Upon input of the corrected CPICH-SIR, the CPICH-SIR/CQI report value conversion portion 65 uses the conversion table (see FIG. 13) to determine the CQI report value corresponding to the corrected CPICH-SIR, and inputs this value to the HS-DPCCH generation portion 58.

From the above, even when in a fading environment, the mobile station can accurately measure the HS-PDSCH reception quality, and can determine and report to the transmitting apparatus the CQI corresponding to this reception quality.

(C) Configuration of the Base Station

Figure 4:
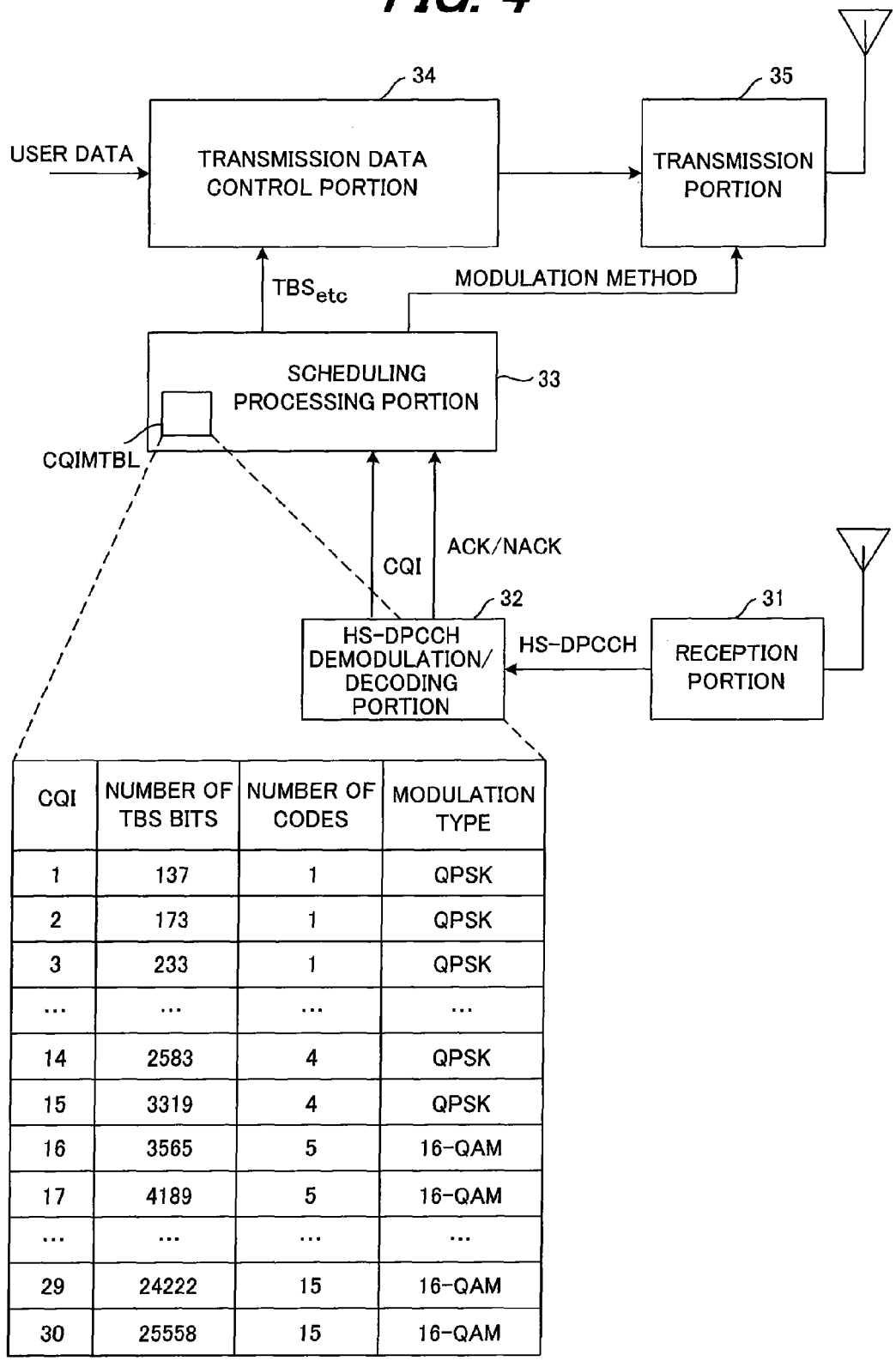
FIG. 4 shows the configuration of principal portions of a base station.

FIG. 4 shows the configuration of principal portions of a base station. The reception portion 31 receives wireless signals transmitted from the mobile station, down-converts the signals to baseband signals, performs quadrature demodulation of the baseband signals, performs AD conversion and despreading, and outputs the HS-DPCCH symbol signals and the symbol signals for other channels. The HS-DPCCH demodulation/decoding portion 32 demodulates and decodes the HS-DPCCH symbol signals, and inputs CQI report values and ACK/NACK signals to the scheduling processing portion 33. The scheduling processing portion 33 performs resend control based on ACK/NACK signals, determines the transmission rate based on the CQI report value, and sets the rate in the transmission data control portion 34 and transmission portion 35. That is, the scheduling processing portion 33 determines the transport block size (number of bits) TBS, number of multiplexing codes, and modulation type from the internal CQI mapping table CQIMTBL according to the CQI report value, and sets these parameters in the transmission data control portion 34 and transmission portion 35. The transmission data control portion 34 creates HS-PDSCH data based on the TBS, number of multiplexing codes and similar and inputs the results to the transmission portion 35, and the transmission portion 35 performs spreading and DA conversion of the input data and performs modulation using the modulation method specified by the scheduling processing portion 33, frequency-up-converts the data, and transmits the data from the antenna. The transmission data control portion 34 and transmission portion 35 create and transmit HS-SCCH control data prior to the HS-PDSCH data.

Because the CPICH-SIR correction processing portion 64 of the mobile station can accurately output the SIR of HS-PDSCH symbols even in a fading environment, the mobile station can report the appropriate CQI corresponding to the HS-PDSCH reception environment to the base station, without being influenced by the fading environment. As a result, the communication system throughput can be improved, without excessively high quality as in the prior art.

(D) Correction SIR Adjustment

In the above, a correction value $(=\Delta SIR)$ was calculated using equation (1); but the correction value $(=\Delta SIR)$ can be adjusted by saving past correction values for a plurality of measurement periods, and applying a prescribed weighting to and combining these values. Combination is performed with smaller weightings for older correction values.

Figure 5:
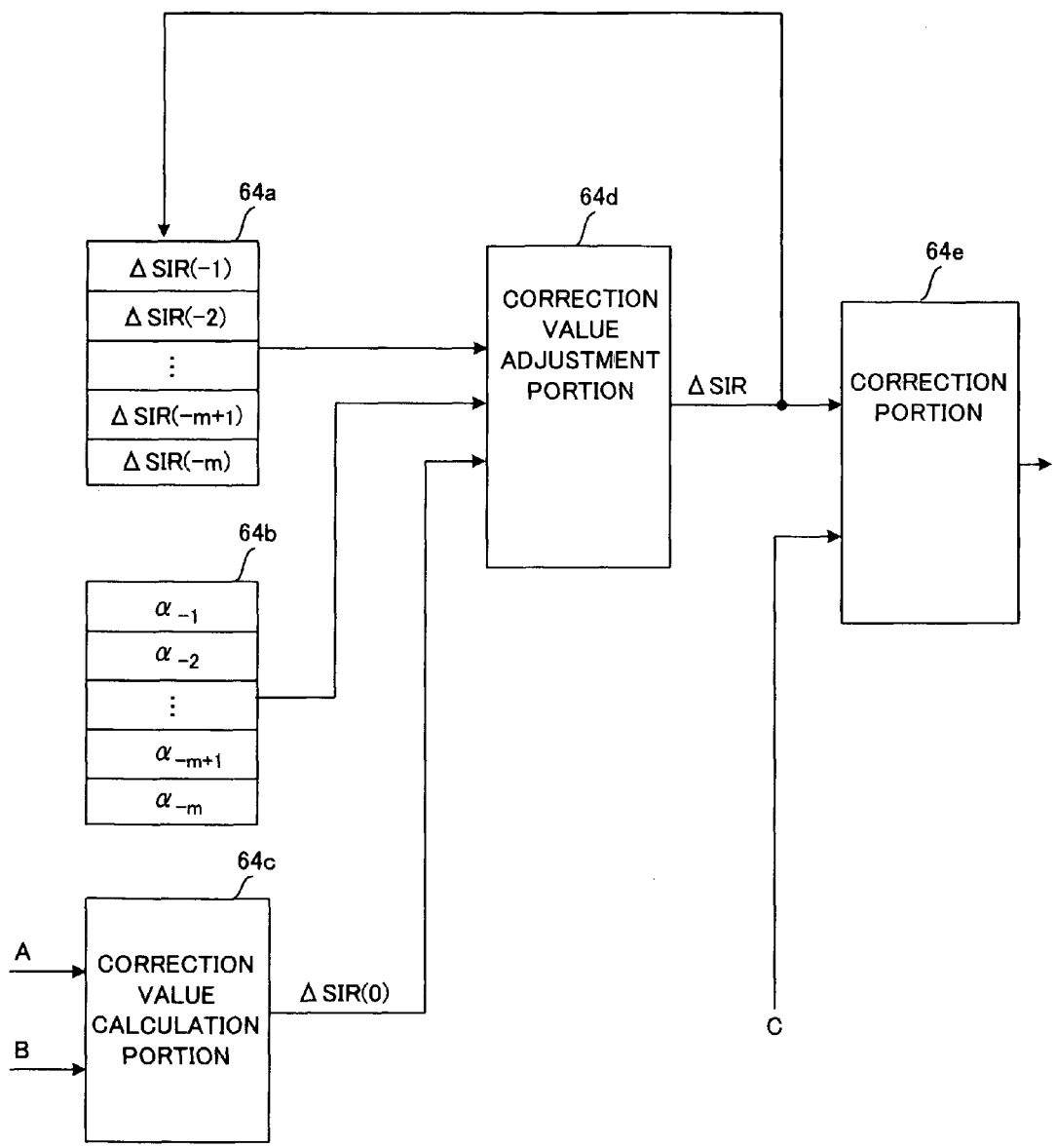
FIG. 5 shows the configuration of a reception quality adaptive processing.
Figure 6:
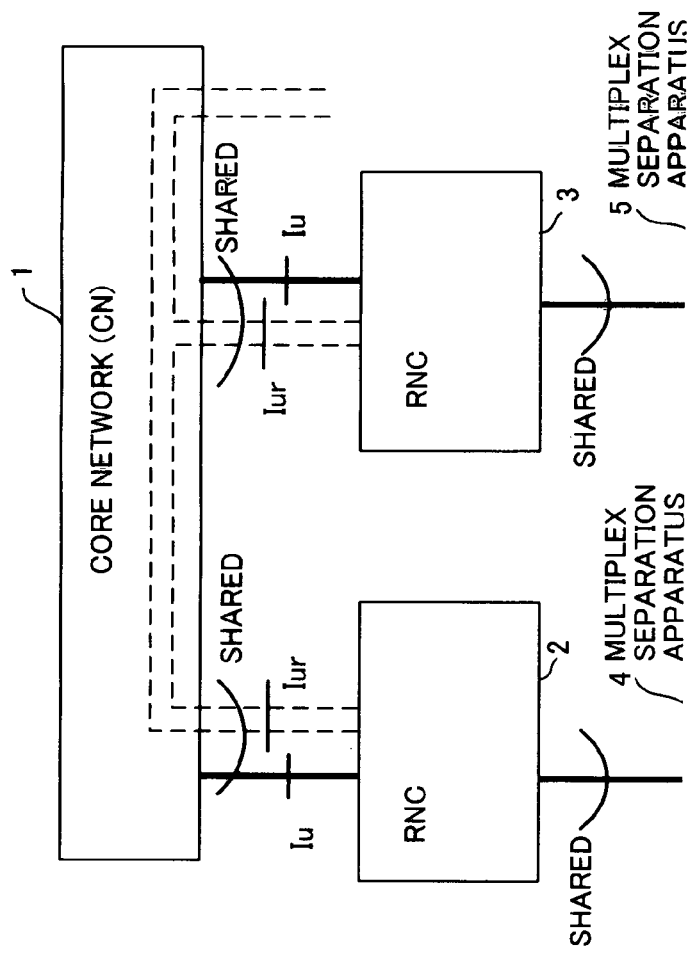
FIG. 6 is an example of the configuration of a W-CDMA mobile communication system.
Figure 7:
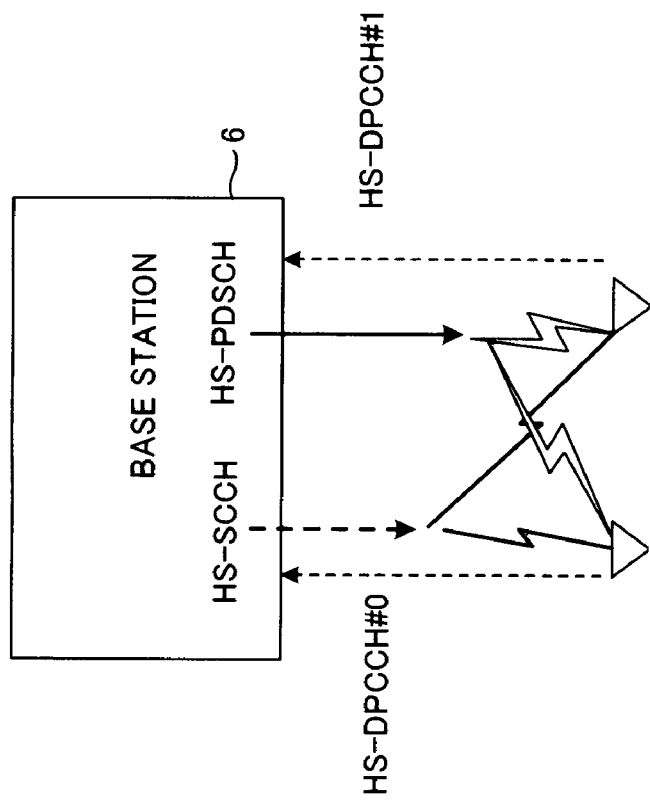
FIG. 7 explains the main wireless channels used in HSDPA.

FIG. 5 shows the configuration of a CPICH-SIR correction processing portion 64 which performs correction adjustment.

The correction value storage portion 64a saves a plurality (m) of correction values $\Delta SIR(-1)$ to $\Delta SIR(-m)$ for the most recent measurement periods, shifting the values in sequence, and the weighting coefficient storage portion 64b stores weightings $\alpha_{-1}$ to $\alpha_{-m}$ of the correction values $\Delta SIR(-1)$ to $\Delta SIR(-m)$. The weightings $\alpha_{-1}$ to $\alpha_{-m}$ are smaller for older correction values, and are related as $\alpha_{-1}>\alpha_{-2}>\ldots>\alpha_{-m}$. The correction value calculation portion 64c calculates the correction value $\Delta SIR(0)(=B-A)$ in the current measurement period using equation (1), and the correction value adjustment portion 64d uses the equation $$\Delta SIR = \alpha_0 \times \Delta SIR(0) + \alpha_{-1} \times \Delta SIR(-1) + \ldots + \alpha_{-m} \times \Delta SIR(-m)$$

to calculate the correction value; the reception quality correction portion 64e uses equation (2) to correct and output the reception quality. Here, $\alpha_0 > \alpha_{-1}$. Also, $\Delta SIR$ becomes $\Delta SIR(-1)$ and is stored in the correction value storage portion 64a.

In the above embodiment, the CPICH symbol reception quality SIR was measured as the reception environment of the mobile station; however, other means can also be used to measure the reception environment.

Further, in the above embodiment the reception quality calculation period was the period of one slot, but this invention is not limited to such a period.

What is claimed is:

1. A reception quality calculation method, in which past CPICH symbols are used to estimate the current channel, the current CPICH symbols are channel-compensated based on a channel estimation value obtained, and the channel-compensated CPICH symbols are used to calculate reception quality, the method comprising:
   performing first channel compensation of past CPICH symbols using a past channel estimation value and saving the past CPICH symbols;
   calculating a reception quality using the channel-compensated past CPICH symbols obtained by the first channel compensation, as a first reception quality and saving the first reception quality;
   performing second channel compensation of the past CPICH symbols which have been saved using a current channel estimation value, and calculating a second reception quality using the channel-compensated past CPICH symbols obtained by the second channel compensation;
   determining a reception quality correction value on the basis of the difference between the second reception quality and the saved first reception quality;
   performing channel compensation of the current CPICH symbols using the current channel estimation value, and calculating a third reception quality using the channel-compensated current CPICH symbols; and
   correcting the third reception quality with the reception quality correction value and outputting the corrected third reception quality.

2. The reception quality calculation method according to claim 1, comprising a step, when the reception quality is measured with a prescribed period, of regarding the third reception quality as a first reception quality and the current CPICH symbols as past CPICH symbols respectively, and of performing correction processing on the next reception quality using the first reception quality and the past CPICH symbols.

3. The reception quality calculation method according to claim 1, comprising a step, when the reception quality is measured with a prescribed period, of estimating the channel in the current measurement period using the past two periods' worth of CPICH symbols.

4. The reception quality calculation method according to claim 1, comprising a step of saving correction values in a plurality of past measurement periods, and of correcting the reception quality using these correction values and the correction value for the current measurement period, thereby adjusting the corrected reception quality.

5. The reception quality calculation method according to claim 4, wherein, in the correction step, reception quality is corrected using weightings which are smaller for older correction values.

6. A reception quality calculation apparatus, which uses past CPICH symbols to estimate the current channel, performs channel compensation of current CPICH symbols based on a channel estimation values obtained, and calculates reception quality using the channel-compensated CPICH symbols, comprising:
- a first channel compensation portion, which performs first channel compensation of past CPICH symbols using a past channel estimation value;
- a storage portion, which saves the reception quality calculated using the channel-compensated past CPICH symbols obtained by the first channel compensation, as a first reception quality, and which saves said past CPICH symbols;
- a second channel compensation portion, which performs second channel compensation of the past CPICH symbols saved in the storage portion, using a current channel estimation value;
- a first reception quality calculation portion, which calculates a second reception quality for correction using the channel-compensated past CPICH symbols obtained by the second channel compensation;
- a correction value computation portion, which calculates a reception quality correction value on the basis of the difference between the second reception quality and the saved first reception quality;
- a second reception quality calculation portion, which calculates a third reception quality using channel-compensated CPICH symbols which are obtained by performing channel compensation of current CPICH symbols using the current channel estimation value; and
- a reception quality correction portion, which corrects the third reception quality with the reception quality correction value and outputs the corrected third reception quality.

7. The reception quality calculation apparatus according to claim 6, comprising means which, when reception quality is measured with a prescribed period, regards the third reception quality as a first reception quality, and the current CPICH symbols as past CPICH symbols respectively, and saves these respective quantities in the storage portion.

8. The reception quality calculation apparatus according to claim 6, comprising a channel estimation portion which, when reception quality is measured with a prescribed period, estimates the channel in the current measurement period using the past two periods' worth of CPICH symbols.

9. The reception quality calculation apparatus according to claim 6, wherein the reception quality correction portion has a correction value holding portion, which stores correction values in a plurality of past measurement periods, and a correction portion, which corrects the third reception quality using these correction values and the correction value determined by the correction value computation portion.

10. The reception quality calculation apparatus according to claim 9, wherein the correction portion corrects the third reception quality using weightings which are smaller for older correction values.

11. A communication apparatus, which transmits parameters corresponding to a reception environment to a transmission apparatus which switches a transmission rate based on the reception environment, comprising:
- a storage portion, which stores reception quality calculated in the past as a first reception quality, and stores past CPICH symbols used in calculating the first reception quality;
- a channel estimation portion, which, when reception quality is measured with a prescribed period, estimates the channel in the current measurement period; using the past two periods' worth of CPICH symbols;
- a channel compensation portion, which performs channel compensation of the stored past CPICH symbols using the current channel estimation value;
- a first reception quality calculation portion, which calculates a second reception quality for correction using the channel-compensated CPICH symbols;
- a correction value computation portion, which outputs, as a reception quality correction value, the difference between the second reception quality and the stored first reception quality;
- a second reception quality calculation portion, which calculates a third reception quality using CPICH symbols which are obtained by performing channel compensation of current CPICH symbols using the current channel estimation value;
- a reception quality correction portion, which corrects the third reception quality using the correction value;
- a parameter acquisition portion, which acquires parameters according to the corrected reception quality; and
- a transmission portion, which transmits the parameters to the transmission apparatus.

* * * * *